United States Patent [19]

Takahashi

[11] 4,406,017

[45] Sep. 20, 1983

[54] METHOD FOR DIVERSITY RECEPTION AND APPARATUS THEREFOR

[75] Inventor: Kozo Takahashi, Higashi-Kurume, Japan

[73] Assignee: Radio Research Laboratories Ministry of Posts & Telecommunications, Koganei, Japan

[21] Appl. No.: 130,717

[22] Filed: Mar. 17, 1980

[30] Foreign Application Priority Data

Jun. 2, 1979 [JP] Japan .................................. 54-68219

[51] Int. Cl.³ .............................................. H04B 7/08
[52] U.S. Cl. .................................... 455/137; 455/139; 455/141; 455/273; 329/122
[58] Field of Search ............... 455/136, 132, 137, 138, 455/139, 141, 273, 275, 276, 316, 57; 343/725, 6 R; 329/122, 50

[56] References Cited

U.S. PATENT DOCUMENTS

| | | | |
|---|---|---|---|
| 2,691,726 | 10/1954 | Leypold | 455/139 |
| 2,951,152 | 8/1960 | Sichak | 455/139 |
| 2,955,199 | 10/1960 | Mindes | 455/139 |
| 3,195,049 | 7/1965 | Altman | 455/139 |
| 3,348,152 | 10/1967 | Laughlin | 455/139 |
| 3,614,625 | 10/1971 | Mayle | 455/141 |
| 3,626,426 | 12/1970 | Steinberg | 455/276 |
| 3,743,941 | 7/1973 | Gans | 455/141 |

Primary Examiner—Tommy P. Chin
Attorney, Agent, or Firm—Oblon, Fisher, Spivak, McClelland & Maier

[57] ABSTRACT

The stability of reception of information signals in a low-quality radio communication circuit is notably improved by a method and apparatus of diversity reception which, by means of the local oscillation frequencies of a plurality of receiving systems, permits one or more coherently interrelated received signals to be phase-locked in the phase-lock loops of the respective receiving systems and which, when any of the phase-lock loops has accidentally lost the phase-lock of the received signals, enables the lost phase-lock loop to resume normal phase-lock by borrowing and using, as its own local oscillation frequency, the local oscillation frequency of the phase-lock loop of one of the remaining receiving systems still locking the phases of the received signals.

14 Claims, 5 Drawing Figures

Fig_1 (PRIOR ART)
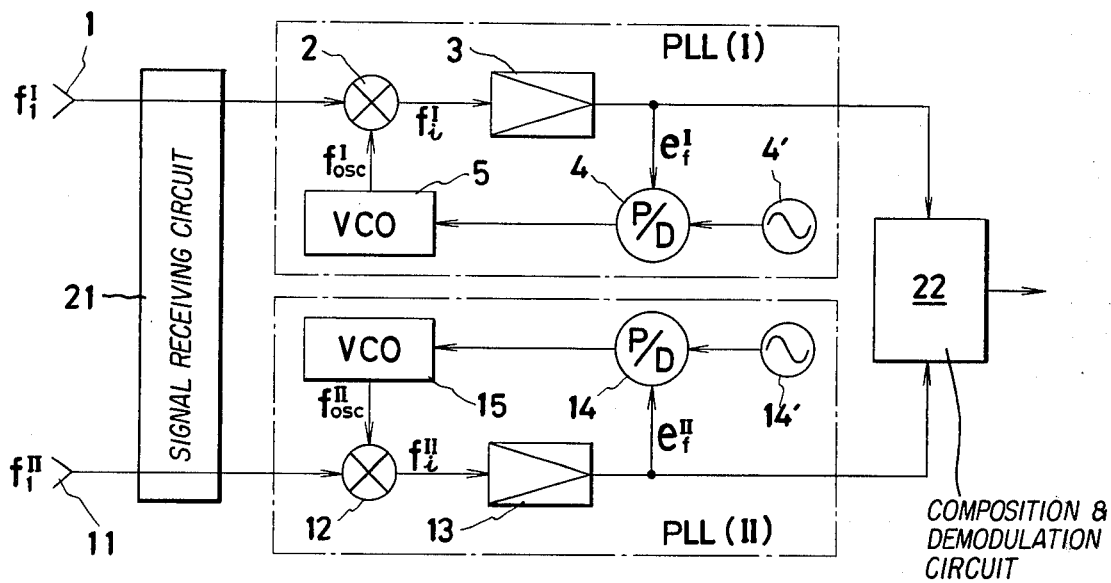
Fig_2
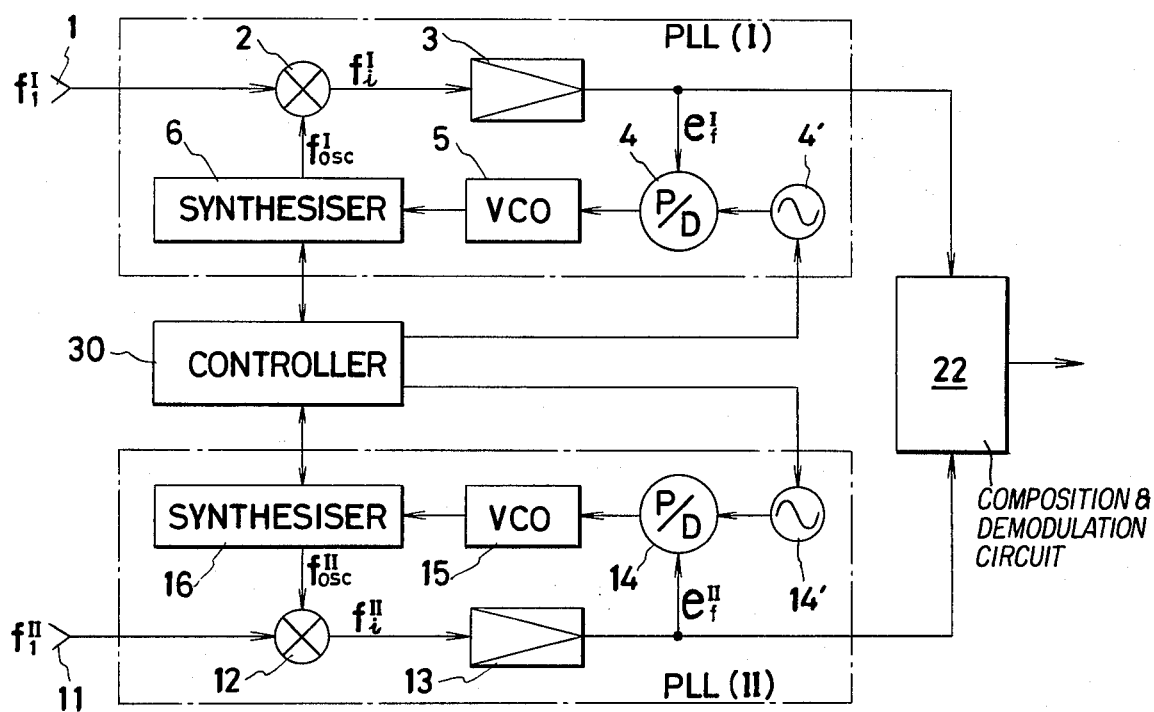

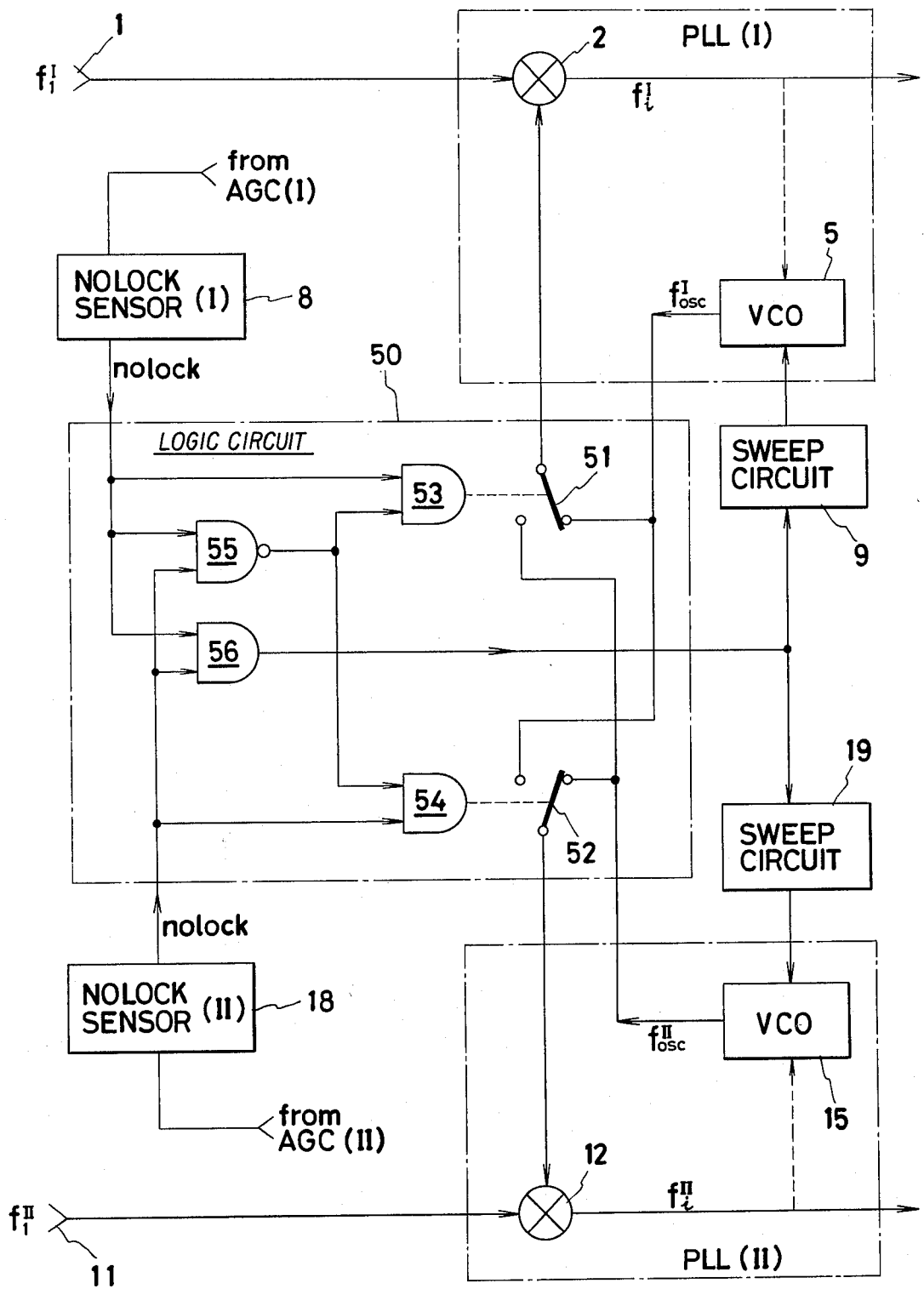

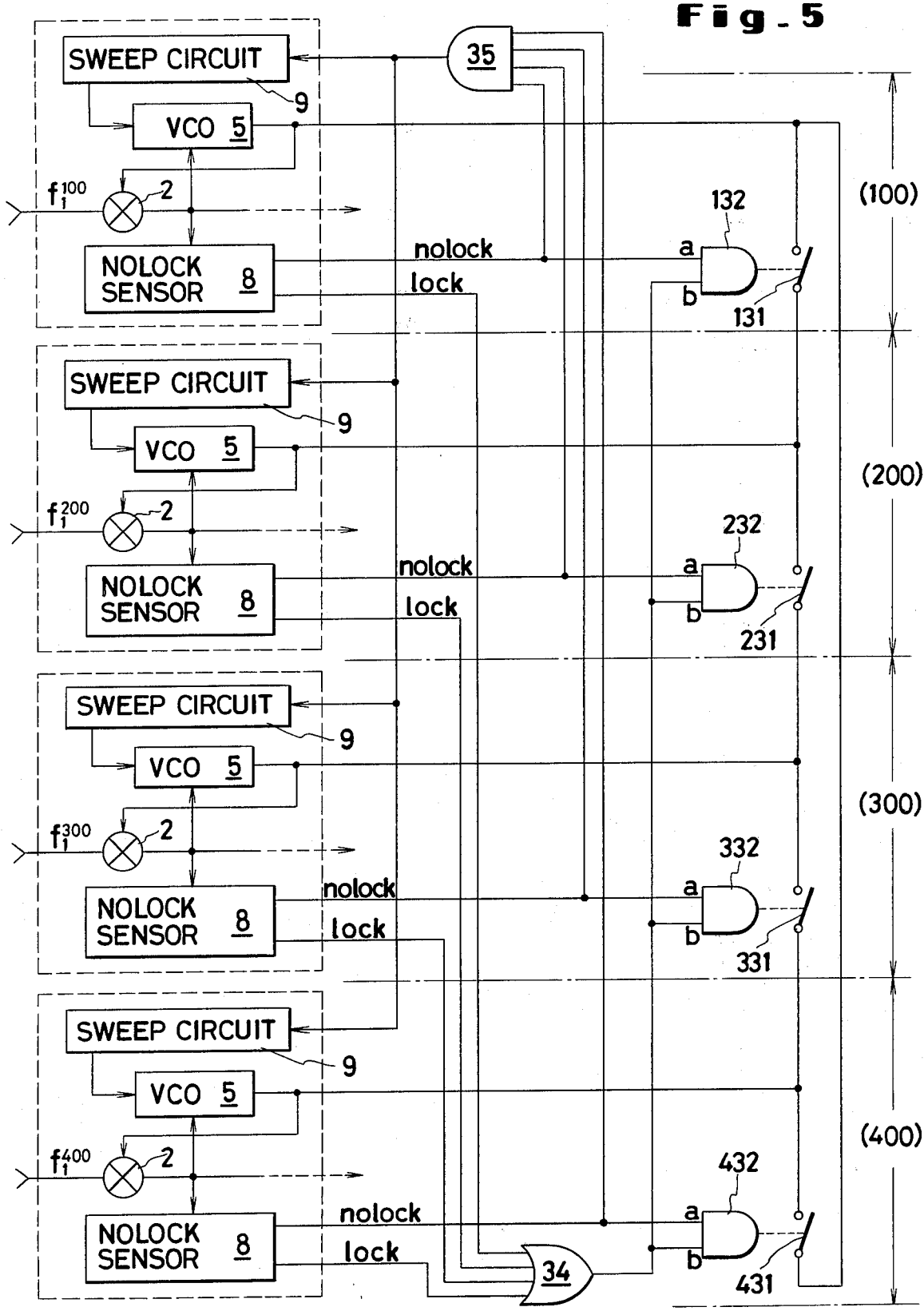

METHOD FOR DIVERSITY RECEPTION AND APPARATUS THEREFOR

BACKGROUND OF THE INVENTION

This invention relates to a method for diversity reception capable of maintaining a communication circuit with high reliability in a low-quality communication circuit and to an apparatus to be used for practicing the method.

Progress in the science of communication is expected to increase the reliability of communication in the transmission of information at great distances. In low-quality communication circuits such as in satellite communication and beyond-the-horizon communication, the signals received have a very low carrier-to-noise ratio (C/N) or desired-to-undesired signal ratio (D/U), and the signals, while propagating over great distances, are highly susceptible to fading, atmospheric interference and ratio interference. Consequently, the threshold level of received power is lowered even to a point where interruption of communication occurs frequently. Diversity communication has been developed to the level of practical utility with a view to improving the quality of received signals in the field of distance reception. Diversity communication aims to enable the reception of signals to be obtained in the highest possible condition by utilizing all possible devices involving use of a plurality of propagation paths or channels, adoption of specific techniques and choice of physical layouts, receiving one single signal through the medium of any of the aforementioned devices using two or more reception systems, selecting or combining the signal energies obtained in the plurality of reception systems thereby avoiding possible effects such as of fading to the utmost extent.

Broadly, diversity communication is divided into frequency diversity communication involving use of transmission signals of different frequencies, space diversity communication having a main and an auxiliary antenna installed at a proper distance from each other on the receiving unit side, polarization diversity communication involving variation in the plane of polarization, angle diversity communication involving variation in the direction, etc. In the corresponding various forms of diversity reception, the stability of the reception of signals is improved by providing their respective receiving units with a phase lock loop (hereinafter referred to as PLL) which is generally adopted for the purpose of minimizing possible effects of variations in the frequency of transmitted signals or variations in the locally oscillated frequency of the receiving unit. Even in diversity reception system utilizing PLL, however, the interruption of the reception as by atmospheric interference, radio interference or internal noise of the receiver cannot be completely eliminated. The reception of signals in the plurality of systems is stabilized by phase-locking the received signals at the central frequency thereof with the local oscillation signals which are voltage controlled in accordance with the phase difference between those of the received signals and the reference frequency signals. Despite the stability of signal reception described above, the reception of signal by any of the systems is interrupted when the phase-lock in the system is lost because of atmospheric interference or radio interference or because of internal noise of the receiver, for example. Upon this interruption, the circuit in such a system automatically actuates its own search functions to sweep the region of frequency in the neighborhood of the frequency of the received signal and resume phase-locking of the received signal in the system. If, however, the phase-lock in the PLL circuits of the remaining systems is lost while the search is in process prior to the resumption of the phase-lock, the reception of signals by the systems becomes totally ineffective.

To overcome these difficulties, there have been proposed techniques for facilitating the composition of received signals by use of a transmission signal possessing a coherent frequency (U.S. Pat. No. 2,951,152 patented Aug. 30, 1960, W. Sichak et al. "Radio Diversity Receiving System"; U.S. Pat. No. 2,955,199 patented Oct. 4, 1960, B. M. Mindes "Radio Diversity Receiving System"; and U.S. Pat. No. 3,195,049 patented July 13, 1965, F. J. Altman et al. "Radio Diversity Receiving System with Automatic Phase Control") and techniques for minimizing the probability of failure of phase-lock in the PLL circuit (U.S. Pat. No. 3,348,152 patented Oct. 17, 1967, C. R. Laughlin, Jr. et al. "Diversity Receiving System with Diversity Phase-Lock"). All these newly proposed techniques entail a requirement that, upon failure of the phase-lock in any of the PLL circuits of the plurality of systems, the remaining circuits should automatically actuate their own search functions and resume the phase-lock. However, none of these new techniques is found to possess a special function to shorten the time spent in the resumption of phase-lock.

An object of this invention is to provide a method for diversity reception which enables the communication circuit to be maintained in the condition of high reliability by permitting instantaneous resumption of the phase-lock upon failure of the phase-lock caused in some of the PLL circuits of the plurality of systems owing to atmospheric interference or radio interference or internal noise of the receiver and thereby minimizing the duration of the failure of the phase-lock, and an apparatus to be used for actually working the method described above.

SUMMARY OF THE INVENTION

To accomplish the object described above according to the present invention, there is provided a method for diversity reception which comprises transmitting one form of information signals from a single system or transmitting two or more forms of coherently interrelated information signals from a plurality of systems, receiving the signals thus transmitted, causing the received signals to be phase-locked in the phase-lock loop (PLL) circuits of the plurality of systems and, when the phase-lock in any of the PLL circuits is accidentally lost and, consequently, the reception of signals in the relevent system is interrupted, instantaneously restoring the phase-lock in the affected system by means of the local oscillation (hereinafter referred to as "LO") signal from a remaining PLL circuit still locking the received signals by utilizing the coherence of the separate received signals and thereby shortening the duration of interruption of the reception of signals due to the failure of the phase-lock.

At the instant that the received signals are phase-locked in the affected system by means of the LO signal locally generated from a PLL circuit which is still in service, the PLL circuit in the affected system is relocked on reception of the LO signal and is allowed to resume the normal state of signal reception. Owing to this special function, the method of this invention, when the phase-lock in some of the PLL circuits in the plurality of reception system is lost by atmospheric interference or radio interference or by internal noise of the receiver, notably shortens the duration of interruption of the reception without impairing the quality of received signals and, at the same time, decreases the probability of reception interruption. This function can be conferred upon the diversity receiver simply by providing the receiver with a logic circuit adapted to issue an instruction signal for bypassing the LO signal. The present invention, therefore, produces a notable improvement of the reliability of signal reception without any complication of the construction of the receiver.

The other objects and characteristics of the present invention will become apparent from the further disclosure of the invention to be made hereinafter with reference to the accompanying drawing.

BRIEF EXPLANATION OF THE DRAWING

FIG. 1 is a block circuit diagram of a diversity receiver having the conventional PLL configuration.

FIG. 2 is a block circuit diagram of a frequency diversity receiver having a PLL configuration as one preferred embodiment of the present invention.

FIG. 4 is a block circuit diagram of a diversity receiver according to still another preferred embodiment of the present invention.

FIG. 5 is a block circuit diagram of a diversity receiver according to yet another preferred embodiment of the present invention.

DESCRIPTION OF THE PREFERRED EMBODIMENT

Figure 3:
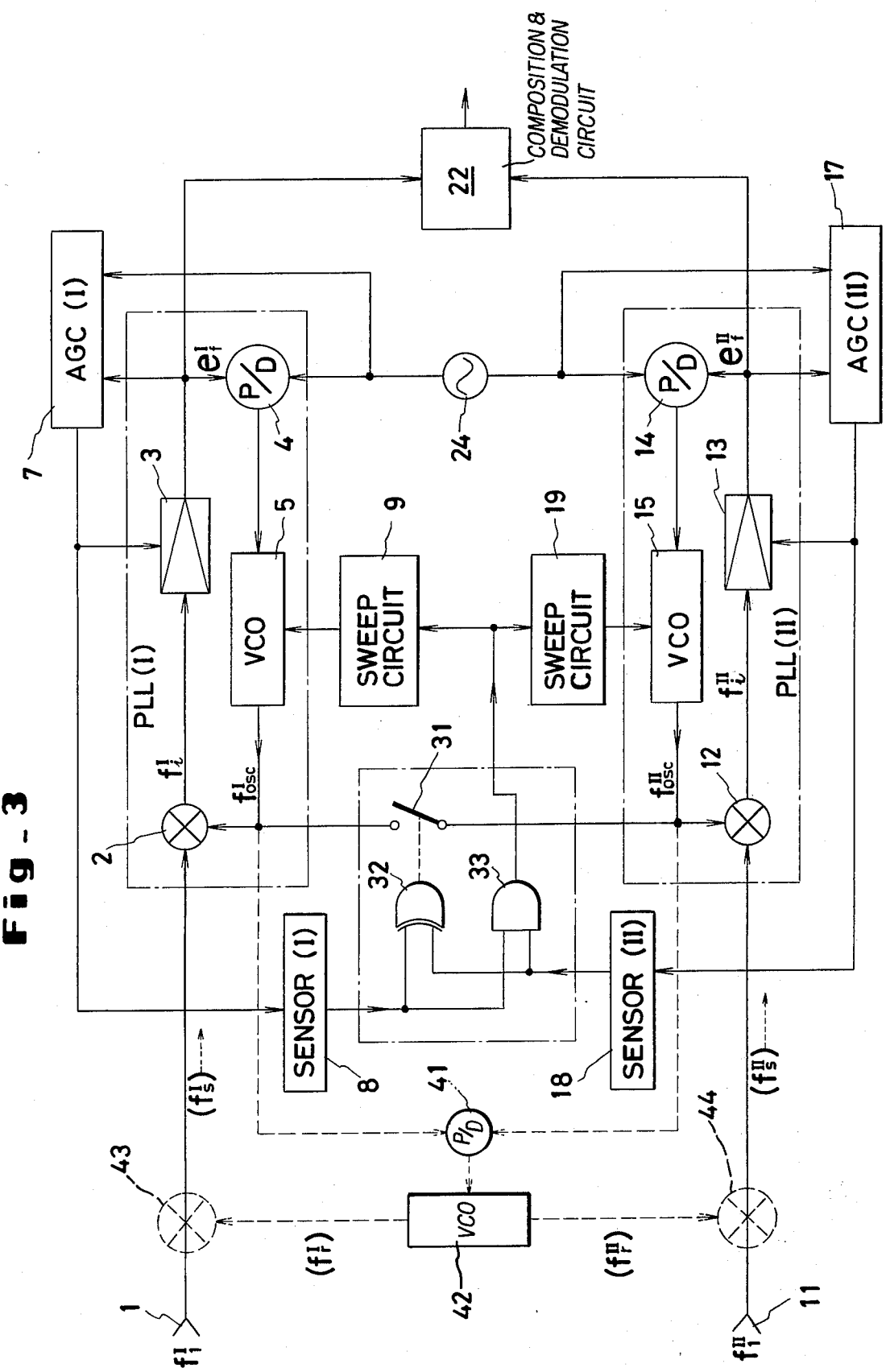
FIG. 3 is a block circuit diagram of a diversity receiver according to another preferred embodiment of the present invention.

This invention relates to a diversity receiver specifically for use in a communication system involving a low-quality communication circuit, which diversity receiver, when the phase-lock of received signals in some of the PLL circuits of the plurality of receiving systems is accidentally lost owing to the effects of fading, atmospheric interference or radio interference exerted upon the signals en route through the propagation path or the effects of the internal noise of the receiver, enables the affected PLL circuits simultaneously to resume phase-lock and resume the normal condition of signal reception by virtue of the local-oscillation(LO) signal from a remaining PLL circuit still in service.

Diversity reception is effected by various methods using, for example, frequency, space, polarization or angle diversities. These methods are further sub-divided according to the types of discriminating reception and composing reception. Invariably in all these methods, the plurality of receiving systems are adapted so that the signals being received in the systems are allowed to be coherent with one another or produce specific interrelation in order for the received signals to be effectively composed. The "coherence" as involved herein means the state in which the phase differences of the individual signals (in the case of signals having different frequencies, those signals of one fixed frequency obtained in consequence of frequency conversion) from the central frequency (CF) are retained within the maximum of $\pi/2$. No technique has ever been developed to decrease the time required for the resumption of reception during an interruption of the reception by making use of the coherence of the received signals. The present invention has originated from a realization of the significance of this coherence.

First, to aid in the comprehension of the function and effect of this invention, a typical diversity receiver provided with a PLL circuit as illustrated in the block circuit diagram of FIG. 1 will be described in outline. This invention can be applied to various methods of diversity reception mentioned above. For example, FIG. 1 illustrates the circuit of a space diversity receiver. Application of this receiver to frequency diversity communication necessitates incorporation of a signal-receiving circuit 21 which is adapted to enable the two forms of received signals of different frequencies to be subjected to frequency conversion and converted into signals of substantially equal frequency and phase before the signals are delivered to the detectors 2, 12.

When the two coherently interrelated received signals $f_1^I, f_1^{II}$ obtained through one or a plurality of antennae are received at the input terminals 1, 11 and forwarded to the detectors 2, 12, the intermediate frequencies (IF) $f_i^I, f_i^{II}$ issuing as outputs from the detectors are passed through amplifying-discriminating circuits 3, 13 serving to effect IF amplification and frequency discrimination. Consequently, the circuits 3, 13 give rise to voltages $e_f^I, e_f^{II}$. The frequency shift of these voltages $e_f$ cause proportional variations in the LO frequencies $f_{osc}^I, f_{osc}^{II}$ in the LO circuits respectively comprising reference frequency (REF) oscillators 4', 14', loop-phase detectors (P/D) 4, 14, and voltage controlled oscillators (VCO) 5, 15, so as to lock the central frequencies of IF $f_i$ of the received signals with the REF's from the oscillators 4', 14'. The aforementioned configuration of circuits forms phase-lock loops (PLL) which function to lock the received signals with the respective LO frequencies $f_{osc}$. In the meantime, the outputs from the amplifying-discriminating circuits 3, 13 undergo composition and demodulation in the circuit 22 to give rise to an audio signal. In the diversity receiver of this operating principle, normal signal reception is effected only when the received signals are phase-locked at least in one of the two PLL circuits involved. This diversity receiver is completely disabled when the phase-lock is lost in one of the PLL circuits owing to the effects of fading, atmospheric interference or radio interference exerted on the signals en route in the propagation path or the effects of the internal noise of the receiver and, before the search function consequently actuated for the resumption of the phase-lock has fulfilled its role, the phase-lock in the remaining PLL circuit is additionally lost. In one respect, therefore, the present invention aims to preclude the possibility of such total interruption of signal reception by allowing, for example, the LO frequency $f_{osc}^{II}$ of the PLL (II) circuit to be effectively borrowed in the PLL (I) circuit when the phase-lock of received signals in that PLL (I) circuit is lost. This borrow function of the LO frequency can be obtained mutually between the two PLL (I), (II) circuits because the received signals in the respective circuits are coherently interrelated as described above.

FIG. 2 represents a block diagram of a receiver utilizing frequency diversity reception as one embodiment of the present invention. In this receiver, the IF's of the received signals are stably phase-locked by subjecting the outputs from the VCO's 5, 15 to arithmetic operation in the synthesizers 6, 16 and delivering the resultant LO frequencies $f_{osc}$ to the detectors 2, 12 instead of utilizing the function of the signal receiving circuit 21 of the circuit of FIG. 1. In this receiver, the operation and function of the PLL circuits are identical to those involved in the circuit of FIG. 1.

The present receiver is provided with a controller 30 which is adapted to allow one PLL circuit, when it loses the phase-lock, to mutually borrow the LO frequency from the other PLL circuit. This controller 30 functions to equalize in phase the outputs of the reference frequency (REF) oscillators 4', 14', detect a failure in the phase-lock of received signals in the PLL circuits, allow the synthesizer in the PLL circuit suffering failure of lock to borrow the LO output from the synthesizer of the other PLL circuit retaining the phase-lock intact and, thereby, enable the PLL circuit to resume the lost phase lock. This borrow function is rendered feasible because the signals in transmission, even when subjected to variation of frequency, for example owing to some disturbances encountered in the propagation path, yield to variation of frequency at a certain fixed ratio in the same direction and, as a result, in accordance with the multiple relationship predetermined in the transmitter, the PLL circuit involving the failure of phase-lock can utilize the LO frequency of the other PLL circuit in the phase-locked condition. Since the PLL circuit involving the failure of phase-lock enjoys instantaneous resumption of the normal state of signal reception upon receiving the LO frequency of the other PLL circuit, the time required for search in the present receiver is notably shorter than when, as in the conventional receiver, the separate PLL circuits are required to sweep wider regions of frequency independently of each other.

Now, diversity reception by the conventional method and that by the method of the present invention will be analyzed with respect to the probability of suspended signal reception. In diversity reception wherein coherence does exist between the plurality of received signals and this coherence is not utilized, the rate of suspended signal reception, $Q_i$, may be expressed by the following formula:

$$Q_i = Q^n \quad (1)$$

wherein, Q denotes the rate of suspended signal reception in the absence of diversity reception ($=\Delta t/(t+\Delta t)$; where $\Delta t$ stands for the average value of time required for the resumption of lost phase-lock and t for the average value of the duration of phase-lock) and n denotes the number of reception systems used.

It is clear from the formula (1) that the effect of diversity is large when the value of Q is small but that this effect substantially is lost when the value of Q is increased.

By contrast in the method of this invention wherein the LO frequencies in the respective PLL circuits can serve as mutual complements, the rate of suspended signal reception, $Q_c$, may be expressed by the following formula:

$$Q_c = [\delta t/(t+\delta t)]^n \cdot t/(t+\Delta t) \quad (2)$$

wherein, $\delta t$ denotes the average value of the time which passes between the time the phase-lock is lost in either of the PLL circuits and the time that PLL circuit resumes the phase-lock by making use of the LO frequency of another PLL circuit retaining the received signals in the phase locked condition. To be specific, in the formula (2), the term $\delta t/(t+\delta t)$ represents the rate or failure of phase-lock in either of the PLL circuits, the term $[\delta t/(t+\delta t)]^n$ the probability that the phase-locks in all the PLL circuits in the total of n systems are lost, and the term $[\delta t/(t+\delta t)]^n \Delta t$ the expected value of the value $\Delta t$.

This $\Delta t$ represents the time required for the detection of the failure of the phase-lock in the relevant PLL circuit and for the sweeping with the LO frequency in the receiver. It is substantially inversely proportional to the band width of the PLL circuit and generally has a value on the order of minutes or seconds. On the other hand, $\Delta t$ represents the time required for the detection of the failure of the phase-lock in the relevant PLL circuit and the access of the LO frequency of the receiver from one to the other synthesizer. Thus, the value of this variable is on the order of seconds or milliseconds. It is about one-hundredth of the value of $\Delta t$.

For example, the following conditions are fixed by assuming a typical state of signal reception.

$$n=2; \quad t=\Delta t = 100\delta t$$

Then, Q which represents the rate of suspended signal reception where diversity reception is not relied on, $Q_i$ which represents the rate in diversity reception making no use of the coherence of received signals and $Q_c$ which represents the ratio wherein the PLL circuit is caused to resume the lost phase-lock by utilizing the coherence of received signals as contemplated by the present invention are found to assume the following values in accordance with the formulas given above.

$$Q = 0.5$$

$$Q_i = 0.25$$

$$Q_c = 0.000049$$

Comparison of these values clearly shows that in a low-quality communication circuit, the method of the present invention provides a striking improvement in the reliability of communication circuit. In other words, by the method of diversity reception according to the circuit configuration contemplated by the present invention, the probability of suspended signal reception is about one-ten thousandth of that by the method of reception not resorting to diversity reception and about one-five thousandths of that by ordinary diversity reception. With this method, therefore, the probability of failure of phase-lock occurring simultaneously in both the PLL circuits is extremely small. This method has a truly striking effect particularly in low-quality communication.

FIG. 3 represents an equivalent circuit diagram wherein a concrete configuration is given to the function of the controller used in the preferred embodiment described above. Again in this circuit, the received signals are processed in two systems. This diagram illustrates an embodiment particularly of space diversity reception or the case of reception wherein the output from one antenna is received in a divided form.

Similarly to the preceding embodiment, the received signals $f_1^I$, $f_1^{II}$ obtained through the input terminals 1, 11 connected to at least one antenna are forwarded to the detectors 2, 12 and the received signals are generally locked in the PLL circuits (I), (II) which are composed respectively of amplifying-discriminating circuits 3, 13, phase detectors (P/D) 4, 14 and voltage controlled oscillators (VCO) 5, 15. Although only one reference frequency (REF) oscillator 24 is used in the present embodiment, the output from this oscillator 24 is converted to phases proper to the relevant received signals as are usually observed. Further, similarly to any ordinary receiver, the present embodiment is provided with automatic gain control (AGC) circuits (I) (II) 7, 17 which function to keep the output amplitudes within a fixed range despite possible variation in the intensities (amplitudes) of input signals. If the phase-lock of received signals in either of the aforementioned PLL circuits is lost, for example, and the amplitudes of IF, $f_i^I$, $f_i^{II}$ are decreased or the frequencies of the LO signals $f_{osc}^I$, $f_{osc}^{II}$ are varied to improper values, then the output amplitudes from AGC 7, 17 are lowered below a fixed level. When the outputs of the AGC are below the fixed level, the failure of the phase-lock in the PLL circuit is detected by the signals in the nolock sensors 8, 18.

As the means which constitutes one of the principal functions of the present invention and which, similarly to the controller 30 in the circuit of FIG. 2, enables the LO signal in one system to be borrowed as an LO signal in the other system, there may be used a logic circuit which incorporates a switch 31, for example, for the purpose of bypassing the outputs of the VCO's. In the borrowed use of the outputs of the VCO's, there may arise necessity for separating the detectors 2, 12 from the VCO's of the PLL circuit involving the failure of phase-lock. The embodiment of FIG. 3 represents a case wherein such separation is not required. The switch 31 in the logic circuit is adapted so that it is closed (to make a circuit) at the moment that the phase-lock of received signals is lost in either of the PLL circuits, so as to permit the LO signal in the PLL circuit still in service to be borrowed and used in the other PLL circuit.

The logic circuit which provides the aforementioned operation of the switch 31 and, in addition, issues instruction signals to make the sweep circuits (I), (II) 9, 19 deliver to the respective VCO's the sweep signals for searching received signals when the failure of phase-lock occurs in both the PLL circuits may be formed of an exclusive (Ex.) OR circuit 32 and an AND circuit 33 as shown by way of illustration in FIG. 3. If the phase-lock is lost in the PLL (I) circuit, for example, the consequent drop in the level of the output from the AGC (I) 7 is detected and the nolock sensor (I) 8 is caused to issue a nolock signal. When the nolock signal from the sensor (I) 8 is given to the Ex. OR 32, the Ex. OR 32 issues an output "ON" to close the switch 31 (to make a circuit) when no signal is being issued from the other sensor (II) 18. Consequently, the LO signal $f_{osc}^{II}$ of the PLL (II) circuit is forwarded through the closed switch 31 and is used as an LO signal in the other PLL (I) circuit, enabling the reception of signals by the two systems to be normally retained. Conversely when the failure of phase-lock occurs in the PLL (II) circuit alone, then the LO signal of the PLL (I) circuit is lent to and used in the PLL (II) circuit in the same way as described above.

It is now assumed that the failure of phase-lock occurs in both the PLL circuits and, consequently, the two AGC's (I), (II) 7, 17 issue signals designating the drops of level and the nolock sensors 8, 18 in turn issue nolock signals. In this case, the Ex. OR 32 issues an output "OFF" and the switch 31 is kept open (to keep the circuit broken). By the two outputs, however, the AND circuit 33 is turned "ON" to issue instruction signals to sweep, to the sweep circuits 9, 19. The two sweep circuits deliver sweep voltages to the respective VCO's 5, 15 to effect the search of the regions embracing the neighborhoods of the frequencies of the received signals. As soon as this search causes at least one of the PLL circuits to lock the received signals, then the receiver resumes the normal state of signal reception as described above.

The configuration described above applies to the case of diversity reception wherein signals of a fixed frequency are being received. Application of this configuration to frequency diversity communication involving signals of different frequencies is made feasible by incorporation of a receiving circuit which, as indicated by the dotted lines in the forward section of the block diagram, comprises a phase-difference comparator 41 which detects a phase difference in the outputs $f_{osc}$ from the two VCO's 5, 15 and issues an output proportionately to the phase difference, a voltage-controlled oscillator (VCO) 42 which is controlled by the voltage of the output from the phase-difference comparator 41 and produces two local oscillation (LO) signals $f_r^I$, $f_r^{II}$ and detectors 43, 44 which derive intermediate frequencies $f_s^I$, $f_s^{II}$ from the received signals $f_1$, $f_2$ in response to the LO signals of different frequencies from the VCO 42.

The aforementioned switch 31 may be either an electric relay opened and closed by a solenoid mechanism or a switch formed of a transistor. In fact, it may be in any form insofar as it is capable of being opened and closed by the logic of the Ex. OR output.

The next embodiment illustrated in FIG. 4 is intended for application to the case wherein the path from the VCO of the PLL circuit involving the failure of phase-lock to the detector is at times required to be cut off when the failure of phase-lock occurs in either of the PLL circuits and the output of the VCO of the remaining PLL circuit is borrowed as an LO signal. Both the PLL circuits and the other circuit elements in the configuration of FIG. 4, with the exception of the logic circuit, are identical in circuit arrangement and function with those of FIG. 3. Thus, they are shown in a simplified manner in FIG. 4.

In the embodiment of FIG. 4, the logic circuit 50 which controls the supply of the outputs of VCO's has double-throw switches 51, 52 inserted in the paths extending from the VCO's of the respective systems to the detectors, so that the PLL circuits are independently formed in the respective systems under normal operation. The switches 51, 52 are operated by the output signals from the respective AND circuits 53, 54. Each of the AND circuits issues a signal to operate the corresponding switch when it receives the nolock signal from the corresponding nolock sensor (I) or (II) together with the signal which the NAND circuit 55 issues on receiving either of the nolock signals. Owing to this arrangement, when failure of phase-lock occurs in either of the PLL circuits, only the corresponding switch is operated and the two switches are not operated at the same time. The NAND circuit 55 would assume the "OFF" state and, consequently, the subsequent AND circuits 53, 54 would be made to assume the "OFF" state if the failure of phase-lock occurred in the two PLL circuits and the two nolock sensors simultaneously issued nolock signals. Actually when the failure of phase-lock occurs in the two PLL circuits, the nolock signals consequently issued by the nolock sensors (I), (II) make the AND circuit 56 assume the "ON" state and issue instruction signals to sweep, to the sweep circuits 9, 19 in the two systems. Similarly to the operation involved in the preceding embodiment, the search is made for the received signals released from the phase-lock.

The embodiment so far described represents the case of diversity reception which is effected in two systems. In the embodiment to be cited below, the diversity reception adapted to effect reception of one form of information signal by use of a multiplicity of systems can be accomplished. This embodiment promises a vast improvement in the effect of preventing the interruption of signal reception. Although FIG. 5 illustrates only four systems 100, 200, 300 and 400 by way of example, the number of such systems may be increased. In any event, the individual systems used herein fulfill one same function and the stability of signal reception improves in proportion as the number of these systems increases. A desired increase to the four systems of the configuration of FIG. 5 can be obtained by inserting as many systems as required between the systems 100 and 200 or between the systems 200 and 300 and making necessary connections to the added systems in the same manner as illustrated.

The logic circuit of FIG. 5 is provided with AND circuits 132, 232, . . . and switches 131, 231, . . . adapted to be operated by the outputs from the corresponding AND circuits and electrically connected with the output lines of the VCO's of the adjacent systems when the corresponding switches are closed. Here again, those parts of the circuit configuration illustrated in FIG. 3 which do not directly affect the function of the logic circuit are omitted. It is assumed that each of the blocks enclosed with dotted lines on the lefthand system is composed of a complete system of elements shown on either side of FIG. 3. The nolock sensors 8 used herein are each provided with two output terminals and are always issuing either a nolock signal designating the unlocked state through one of the two output terminals or a lock signal designating the locked state through the other output terminal. The nolock signal issues from the nolock sensor 8 in the respective system to the one input terminal a of each of the AND circuits 132, 232, . . . for operating the switches 131, 231, . . . and the lock signal is delivered from the same nolock sensor 8 to the other input terminal b through the OR circuit 34. That is, when the PLL circuits in all the systems are kept in the locked state and the systems are all in service receiving the incoming signals, the nolock sensors 8 keep on issuing lock signals and the OR circuit 34 is kept in the "ON" state. In this case, since none of the nolock sensors 8 are issuing nolock signals, all the AND circuits 132, 232, . . . remain in the "OFF" state and all the switches 131, 231, . . . remain unclosed. Now, it is assumed that the phase-lock is lost in the PLL circuit of the system 200, for example. As the sensor 8 of the system 200 issues an nolock signal to the input terminal a of the AND circuit 232, the lock signal from the sensor 8 of any one of the remaining systems gives an output ON to the other input terminal b of all the AND circuits 132, 232, . . . . Consequently, only the AND circuit 232 is allowed to issue an output signal to close the corresponding switch 231. As a result, the output from the VCO of the system 300 is delivered to the detector 2 of the system 200 to resume the phase-lock in the relevant PLL circuit and enables the system 200 to resume its normal state of reception. This same operation is performed in each of the systems so that, when the phase-lock is lost in the PLL circuit of a given system, this system is enabled to utilize the local oscillation signal of the adjacent system. When the failure of the phase-lock occurs simultaneously in two adjacent systems 300 and 400, for example, the switches 331 and 431 are closed and the local oscillation signal of the system 100 is delivered to these systems, with the result that all the four systems assume the normal state of reception. The entire receiver, accordingly, is allowed to maintain stable reception without interruption.

When the failure of phase-lock occurs in the PLL circuits of all the systems, the nolock sensors in all the systems issue nolock signals. As a result, none of the switches are closed. Also, the logic circuit is further provided with the AND circuit 35 which is caused to produce an output when it receives nolock signals from all the systems. When the failure of phase-lock occurs in the PLL circuits of all the systems, therefore, the AND circuit 35 issues instruction signals to sweep to the sweep circuits 9 of all the systems. Consequently, the sweep circuits provide a sweep voltage to the corresponding VCO's 5 to search for the received signals released from the phase-lock. When, in this embodiment, there arises the necessity of cutting off the path extending from the VCO to the detector in the system wherein the failure of phase-lock has occurred in the PLL circuits, it suffices to have the same double-throw switch as shown in FIG. 4 connected into the path in the same manner.

As is clear from the disclosure thus far made, the method of the present invention for diversity reception, when applied to a receiver which is designed to ensure high stability of signal reception by causing a plurality of coherently interrelated received signals to be phase-locked in the PLL circuits serving independently for the plurality of receiving systems, enables any of the plurality of receiving systems in which the PLL circuit has accidentally lost the received signals from the phase-lock to resume its normal state of reception instantaneously by permitting the particular PLL circuit in trouble to borrow the local oscillation signal from any of the systems having the received signals safely phase-locked in their respective PLL circuits. Further, this method provides a notable decrease in the duration of suspended reception of signals which occurs when the failure of phase-lock occurs simultaneously in all the receiving systems. By increasing the number of receiving systems, this method brings about a remarkable decrease in the probability of the total failure of phase-lock in all the systems. Thus, the present invention enables low-quality communication circuits to provide highly stable reception of transmitted signals.

What is claimed is:

1. A method of diversity reception, comprising the steps of transmitting one type of information signals in the form of one or more coherently interrelated signals, receiving the transmitted information signals in two or more receiving systems and locking the phases of the received information signals in phase-lock loops of the respective receiving systems by means of local oscillation frequencies produced in the phase-lock loops, thereby stabilizing the reception of said information signals, which method of diversity reception is characterized by causing the local oscillation frequency of the phase-lock loop of one of the receiving systems still locking the phase of said received information signals to be applied to the phase-lock loop of one of said receiving systems which has accidentally lost the phase-lock of the received signals, by utilizing the coherence of the separately received signals, thereby to resume the phase-lock of the received signals in said one of said receiving systems which has lost the phase lock.

2. The method of diversity reception according to claim 1, wherein when the failure of the phase-lock of received signals occurs in the phase-lock loop of at least one of said receiving systems, the receiving system having a failed phase-lock is permitted to use, as its own local oscillation frequency, the local oscillation frequency of one of the other receiving systems still phase locking the received signals in their respective phase-lock loop while preventing reception of the local oscillation frequency of the receiving system losing the phase-lock, thereby to resume the phase-lock of the received signals in the receiving system with the lost phase-lock.

3. The method of diversity reception according to any of claims 1 or 2, wherein when the failure of the phase-lock or received signals occurs in the phase-lock loop of at least one of the receiving systems, the local oscillation frequency of one of the remaining receiving systems still phase locking received signals in the phase-lock loops is delivered to the receiving system losing the phase-lock by detecting the failure of the phase-lock of received signals at said at least one receiving system, and further, when the failure of the phase-lock of received signals occurs in the phase-lock loops of all the receiving systems, search for the lost phase lock of the received signals necessary for the resumption of the phase lock is carried out by reception of nolock signals issued from all the receiving systems losing the phase-lock.

4. The method of diversity reception according to claim 3, which is applied to space diversity reception carried out by receiving at different positions one or more received signals possessing one identical frequency.

5. The method of diversity reception according to claim 3, which is applied to the frequency diversity reception carried out by approximately equalizing the frequencies and phases of the plurality of receiving signals possessing different frequencies by means of another set of local oscillation frequencies derived on the basis of the phase difference of said local oscillation frequency produced in said phase-lock loop, thereby to produce central frequencies equalized in phase in the respective receiving systems.

6. The method of diversity reception according to one, of claim 1 or 2, which is applied to space diversity reception carried out by receiving at different positions one or more received signals possessing one identical frequency.

7. The method of diversity reception according to any one of claim 1 or 2, which is applied to the frequency diversity reception carried out by approximately equalizing the frequencies and phases of the plurality of receiving signals possessing different frequencies by means of another set of local oscillation frequencies derived on a basis of the phase difference of said local oscillation frequencies produced in said phase-lock loop, thereby to produce the central frequencies equalized in phase in the respective receiving systems.

8. An apparatus for diversity reception, comprising;
a plurality of receiving systems for separately receiving one form of information signals transmitted in the form of one or more coherently interrelated signals and phase-lock loops incorporated one each in said plurality of receiving systems whereby said phase-lock loops include respective local oscillation frequency means for locking the phases of the received signals;
control circuit means for applying each of said local oscillation frequencies of the phase-lock loop of one of the receiving systems still phase locking received signals to the phase-lock loop of the receiving system which has accidentally lost the phase-lock of the received signals, wherein said control circuit detects and utilizes the coherence of the separate received signals, thereby to reinstate the phase-lock of the received signals in the receiving system losing the phase-lock.

9. The apparatus for diversity reception according to claim 8, wherein said control circuit is provided with at least a switch which is closed when the failure of the phase-lock of received signals occurs in the phase-lock loop of at least one of the receiving systems, and wherein said closed switch effects the application of an output from said control circuit to the phase-lock loop of at least one of the receiving systems losing the phase-lock of the received signals.

10. The apparatus for diversity reception according to claim 9, which further comprises nolock sensors incorporated one each in the plurality of receiving systems and adapted to detect the failure of the phase-lock of received signals in the phase-lock loop of at least one of the receiving systems and issue a nolock signal to said control circuit, thereby causing the control circuit to permit the local oscillation frequency of the phase-lock loop of one of said receiving systems still phase locking received signals to be applied to the phase-lock loop of the receiving system losing the received signals.

11. The apparatus for diversity reception acording to any of claims 8, 9 or 10, which is applied to the space diversity reception carried out by receiving out at different positions one or more transmitted signals possessing one identical frequency.

12. The apparatus for diversity reception according to any of claims 8, 9 or 10, which is further provided at least with a receiving circuit comprising at least a phase-difference comparator adapted to compare the phases of the local oscillation frequencies of the phase lock loops of the plurality of receiving systems and issuing output signals proportionate to the phase differences found, a voltage-controlled oscillator adapted to effect voltage-control by using the output from said phase-difference comparator and issuing another set of local oscillation frequencies, and detectors adapted to convert the received signals into intermediate frequencies in accordance with the local oscillation frequencies of said oscillators, thereby to carry out frequency diversity reception.

13. The apparatus for diversity reception according to claim 10, wherein the control circuit is provided with a sweep circuit for each receiving system which is adapted to deliver to the respective receiving systems sweep voltage in response to the nolock signals from the nolock sensors of all the plurality of receiving systems on occurrence of the failure of the phase-lock of received signals from the phase-lock loops of all said receiving systems, whereby all said receiving systems search the received signals released from the phase-lock in accordance with the sweep voltage issuing from said sweep circuits.

14. The apparatus for diversity reception according to claim 13 wherein the control circuit comprises a logic circuit adapted to close the switch for the receiving system losing phase-lock of the received signals in response to the nolock signal delivered from the nolock sensor of at least one of the plurality of receiving systems involving failure of the phase-lock of received signals, whereby the local oscillation frequency of the phase-lock loop of one of said receiving systems still phase locking receive signals is applied to the phase-lock loop of said receiving system losing phase lock of the received signals, and further adapted to deliver a sweep instruction signal to the sweep circuits for all said receiving systems upon the failure of the phase-lock loop, whereby all said receiving systems search the received signals released from the phase-lock in accordance with the sweep voltage issuing from said sweep circuits.

* * * * *